United States Patent
Arora et al.

(10) Patent No.: US 12,373,188 B2
(45) Date of Patent: Jul. 29, 2025

(54) SYSTEMS, METHODS, AND APPARATUSES FOR IMPROVING COMPUTER ENERGY CONSUMPTION AND COMPUTER PROCESSING BY IMPLEMENTING A PLUGGABLE CARBON EMISSION GATEWAY

(71) Applicant: BANK OF AMERICA CORPORATION, Charlotte, NC (US)

(72) Inventors: Saurabh Arora, Gurugram (IN); Sandeep Kumar Chauhan, Miyapur Hyderabad (IN); Puneetha Polasa, Telangana (IN); Mohit Dhingra, Hyderabad (IN); Sanchit Taggar, New Delhi (IN); Bhagya Lakshmi Sudha Lavanya Mallidi, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 208 days.

(21) Appl. No.: 18/218,707

(22) Filed: Jul. 6, 2023

(65) Prior Publication Data
US 2025/0013451 A1 Jan. 9, 2025

(51) Int. Cl.
G06F 8/65 (2018.01)
G06F 9/46 (2006.01)
G06F 9/54 (2006.01)

(52) U.S. Cl.
CPC ............ *G06F 8/65* (2013.01); *G06F 9/466* (2013.01); *G06F 9/54* (2013.01)

(58) Field of Classification Search
None
See application file for complete search history.

(56) References Cited

U.S. PATENT DOCUMENTS

| 6,804,616 B2 | 10/2004 | Bodas |
| 7,197,433 B2 | 3/2007 | Patel |
| 7,983,929 B2 | 7/2011 | Zimmerman |

(Continued)

FOREIGN PATENT DOCUMENTS

| AU | 2004211783 A1 | 8/2004 |
| CA | 2831621 C | 6/2019 |

(Continued)

*Primary Examiner* — Philip Wang
(74) *Attorney, Agent, or Firm* — Moore & Van Allen PLLC; Lauren M. Stokes

(57) ABSTRACT

Systems, computer program products, and methods are described herein for improving computer energy consumption and computer processing by implementing a pluggable carbon emission gateway. The present disclosure is configured to identify, by a pluggable emission gateway, at least one application programming interface request; generate at least one transaction per second load attribute; identify at least one application consumption; determine at least one emission; identify an emission threshold for the at least one emission; compare the at least one emission to the emission threshold; apply, in an instance where the at least one emission associated with the at least one API request exceeds the emission threshold, at least one API parameter adjustment for the API request; and generate an updated application by applying the at least one API parameter adjustment to at least one of the at least one application or the at least one API request.

20 Claims, 10 Drawing Sheets

(56) References Cited

U.S. PATENT DOCUMENTS

| | | |
|---|---|---|
| 8,004,832 B2 | 8/2011 | Brunschwiler |
| 8,395,621 B2 | 3/2013 | Tung |
| 8,799,899 B2* | 8/2014 | Hur .................... G06F 9/45558 |
| | | 718/1 |
| 8,812,971 B2 | 8/2014 | Benedek |
| 9,800,052 B2 | 10/2017 | Li |
| 10,135,709 B1* | 11/2018 | Segel .................. G06F 11/3684 |
| 10,444,210 B2* | 10/2019 | Rawat .................... G06Q 50/06 |
| 10,489,793 B2 | 11/2019 | Ohnemus |
| 10,712,273 B2 | 7/2020 | Rothberg |
| 11,164,406 B2 | 11/2021 | Meroux |
| 2001/0020219 A1 | 9/2001 | Kishlock |
| 2005/0228618 A1* | 10/2005 | Patel ...................... G06F 9/505 |
| | | 702/188 |
| 2009/0112522 A1 | 4/2009 | Rasmussen |
| 2017/0351978 A1 | 12/2017 | Bellowe |
| 2018/0031533 A1* | 2/2018 | Rawat .................... G06Q 50/06 |
| 2020/0027096 A1 | 1/2020 | Cooner |
| 2020/0160449 A1 | 5/2020 | Bartels |
| 2021/0117981 A1* | 4/2021 | Tian ........................ B60L 50/60 |
| 2023/0042767 A1* | 2/2023 | Bansal .................. G06F 16/954 |
| 2024/0412206 A1* | 12/2024 | Topp ...................... G06Q 20/42 |
| 2024/0419510 A1* | 12/2024 | Natarajan ............. G06F 9/5077 |

FOREIGN PATENT DOCUMENTS

| | | | |
|---|---|---|---|
| CN | 119024944 B | * | 10/2024 |
| WO | WO-2024029389 A1 | * | 2/2024 |

* cited by examiner

SYSTEMS, METHODS, AND APPARATUSES FOR IMPROVING COMPUTER ENERGY CONSUMPTION AND COMPUTER PROCESSING BY IMPLEMENTING A PLUGGABLE CARBON EMISSION GATEWAY

TECHNOLOGICAL FIELD

Example embodiments of the present disclosure relate to improve computer energy consumption and computer processing by implementing a pluggable carbon emission gateway.

BACKGROUND

Carbon emissions and their role on the environment today are a major problem for most technology industries, especially those industries dealing with blockchain, computers, electronic communications, and the like, which all are necessary for everyday life and cannot always be mitigated to improve emissions and help the environment. Thus, there exists a need for a system to—in real time—decrease carbon emission outputs from computing environments, without unduly burdening or slowing down the computer processes and necessary actions of the computers.

Applicant has identified a number of deficiencies and problems associated with improving computer energy consumption and computer processing. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for improving computer energy consumption and computer processing by implementing a pluggable carbon emission gateway.

In one aspect, a system for improving computer energy consumption and computer processing by implementing a pluggable carbon emission gateway title is provided. In some embodiments, the system may comprise: a memory device with computer-readable program code stored thereon; at least one processing device, wherein executing the computer-readable code is configured to cause the at least one processing device to perform the following operations: identify, by a pluggable emission gateway, at least one application programming interface (API) request, wherein the at least one API request is associated with at least one application and at least one API; generate at least one transaction per second (TPS) load attribute associated with the at least one API request; identify at least one application consumption associated with the at least one API request; determine at least one emission associated with the at least one API request; identify an emission threshold for the at least one emission; compare the at least one emission associated with the at least one API request to the emission threshold, wherein, in an instance where the at least one emission associated with the at least one API request exceeds the emission threshold, apply at least one API parameter adjustment for the API request; and generate an updated application by applying the at least one API parameter adjustment to at least one of the at least one application or the at least one API request.

In some embodiments, the system may further comprise: perform an API level contextual analysis on at least one of the at least one API request or the at least one application, wherein the API level contextual analysis comprises: identifying at least one allowable API request associated with at least one secondary application, wherein the at least one allowable API request comprises an allowable emission at or below the emission threshold; identifying at least one allowable parameter associated with the at least one allowable API request and the at least one secondary application; identifying the at least one allowable parameter as the at least one adjustable parameter for the API request; and determining, based on applying the at least one API parameter comprising the at least one allowable parameter to the API request, whether an updated emission of the API request exceeds the emission threshold. In some embodiments, the at least one allowable parameter is applied as a singular adjustable parameter of the at least one adjustable parameter for the API request at a first instance. In some embodiments, the at least one allowable parameter is based on the at least one allowable API request comprising a closest API response to the at least one API request.

In some embodiments, the at least one emission comprises an at least one carbon emission associated with the at least one API request.

In some embodiments, the emission of the API request is based on at least one of a heat output, the at least one TPS load attribute, or a power consumption.

In some embodiments, the system may further comprise: apply the at least one API parameter adjustment for the API request to an API adjustment extension, wherein the API adjustment extension is associated with an API development application, and wherein the API adjustment extension comprises an API development machine learning model trained on at least one API parameter adjustment. In some embodiments, the system may further comprise: generate, by the API development machine learning model, at least one API adjustment suggestion notification; and generate, based on the API adjustment extension, an API adjustment interface component comprising the at least one adjustment suggestion notification, wherein the API adjustment interface component is time sensitive and associated with a production period of the at least one application. In some embodiments, the at least one API adjustment suggestion notification is based on at least one of an application performance of the at least one application for the at least one API request or the at least one emission associated with the at least one API request.

In some embodiments, the system may further comprise: collect a first API request dataset, wherein the first API request dataset comprises at least one emission for each API request of the first API request dataset, at least one parameter for each API request of the first API request dataset, and a developer account identifier for each API request of the first API request dataset; generate a first training dataset based on the first API request dataset; and train the API development machine learning model with at least the first training dataset.

In some embodiments, the API development machine learning model comprises at least one categorized coding pattern associated with the at least one developer account identifier.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
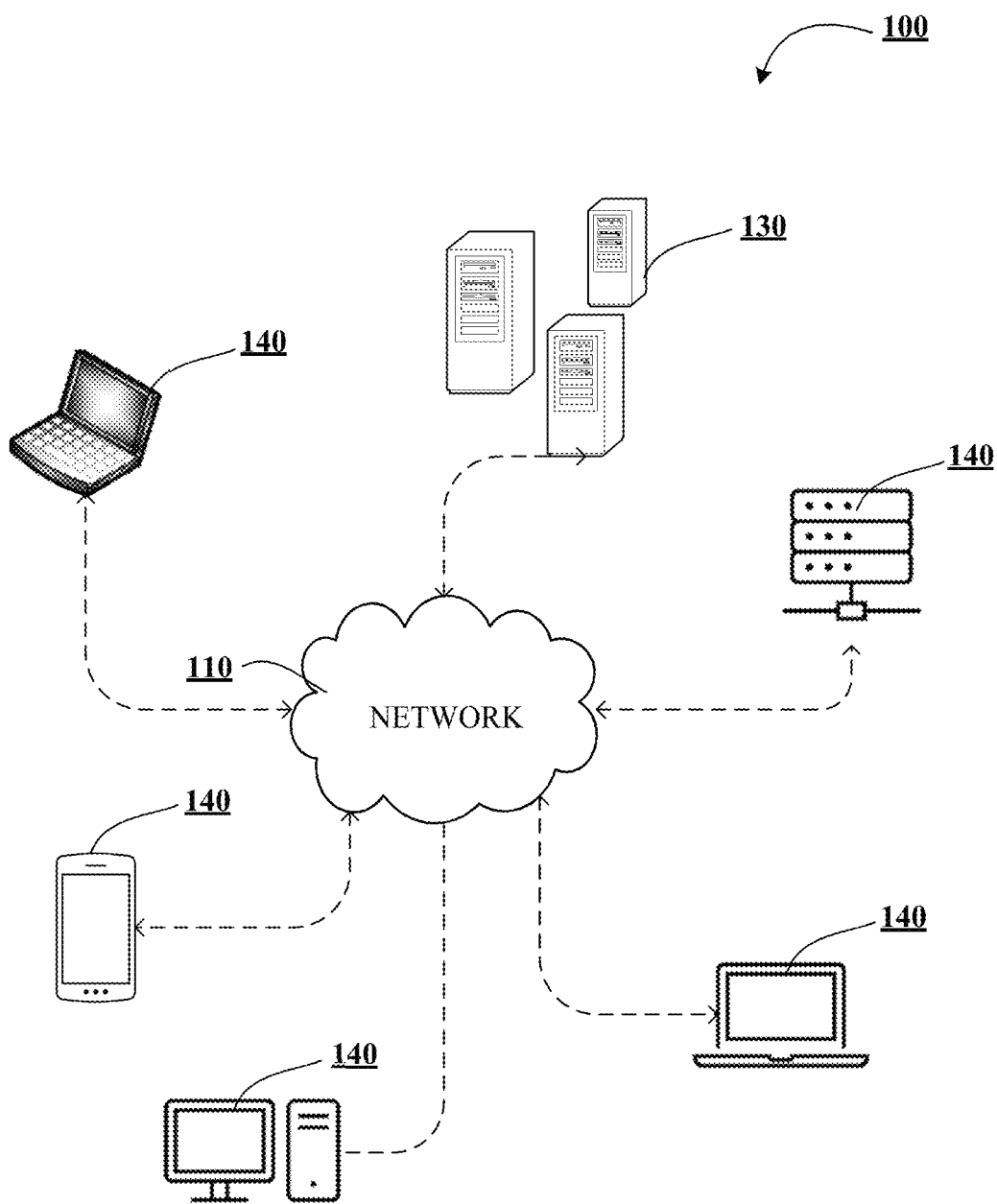
Figure 1B:
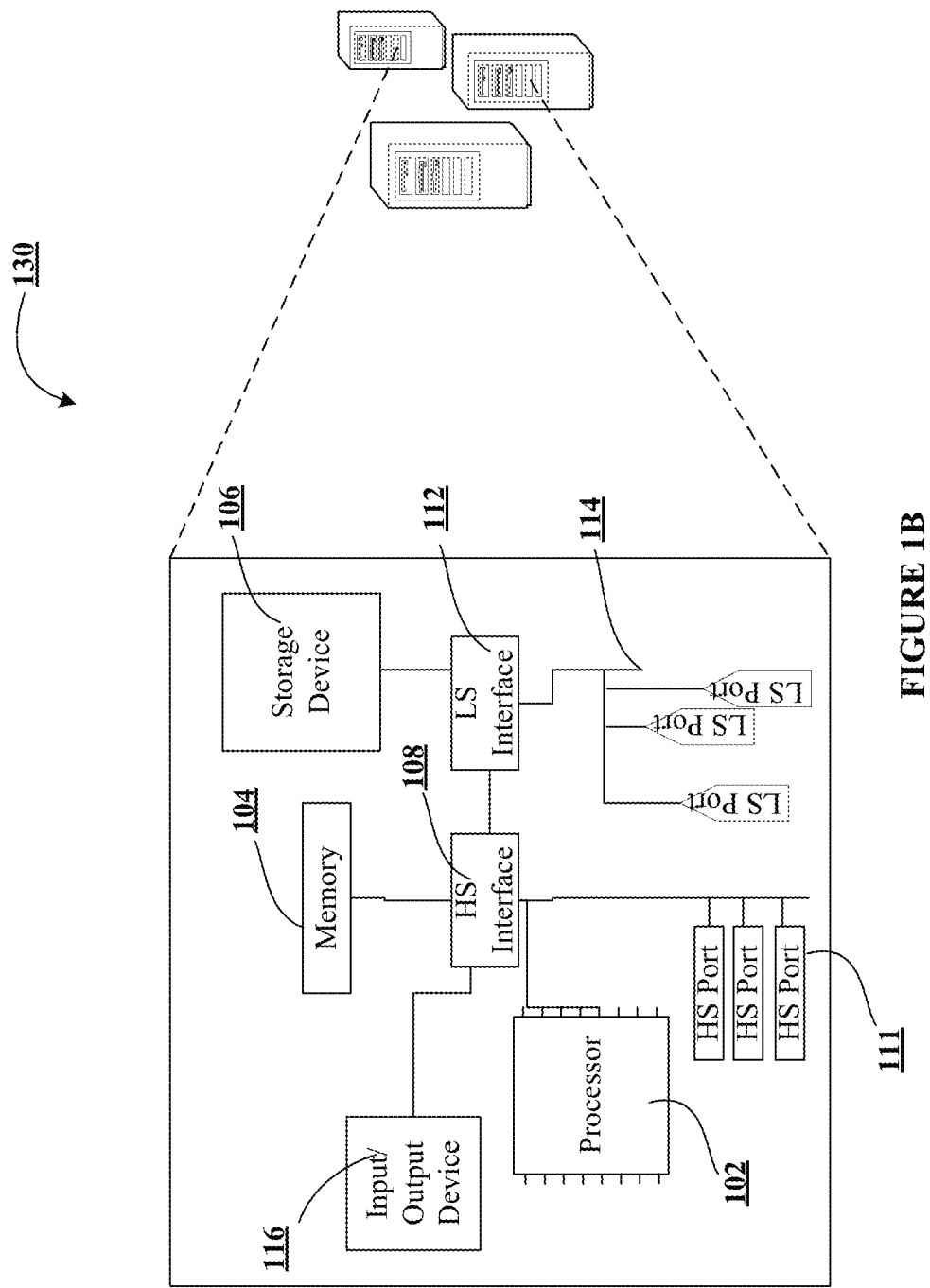
Figure 1C:
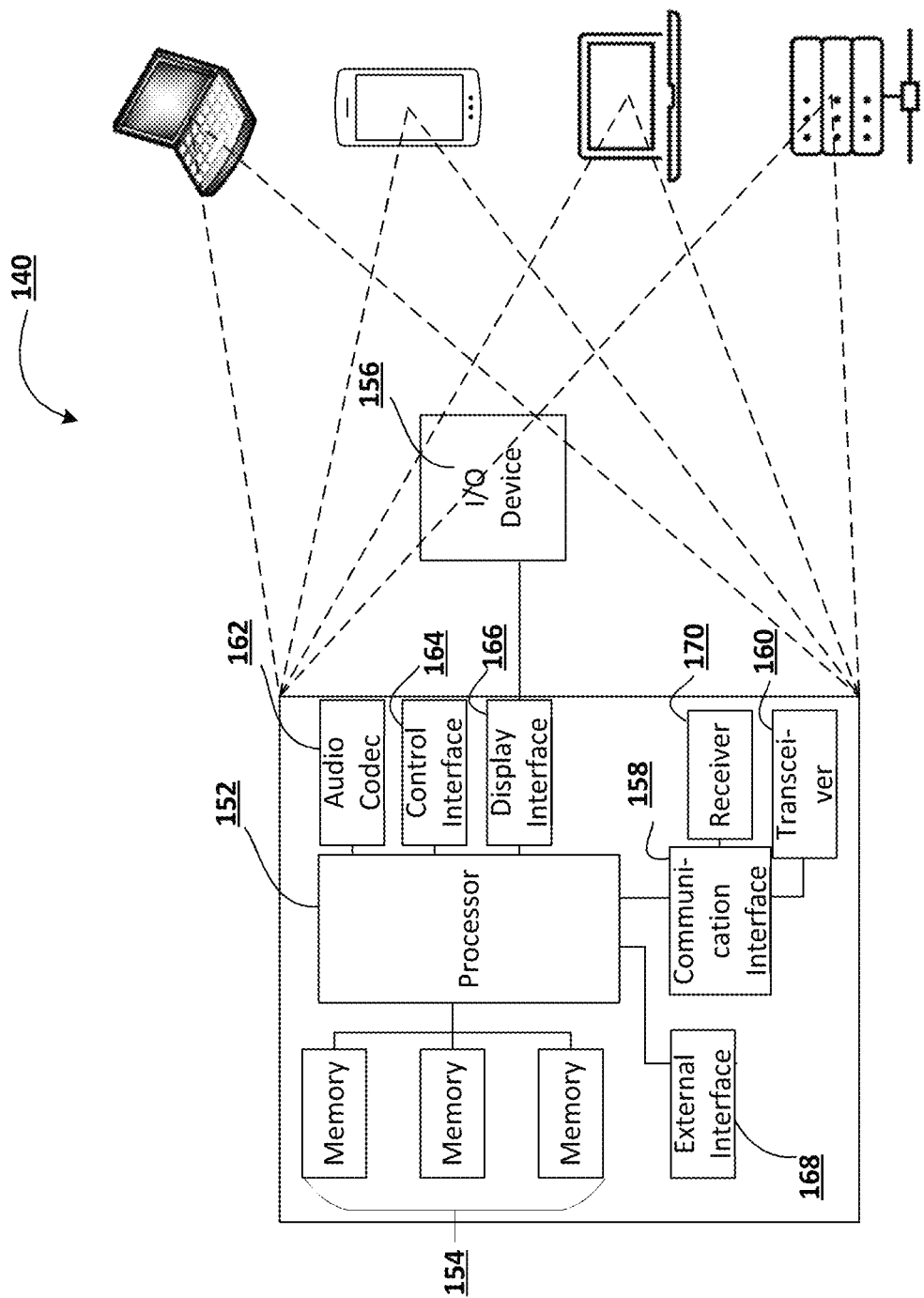
Figure 2:
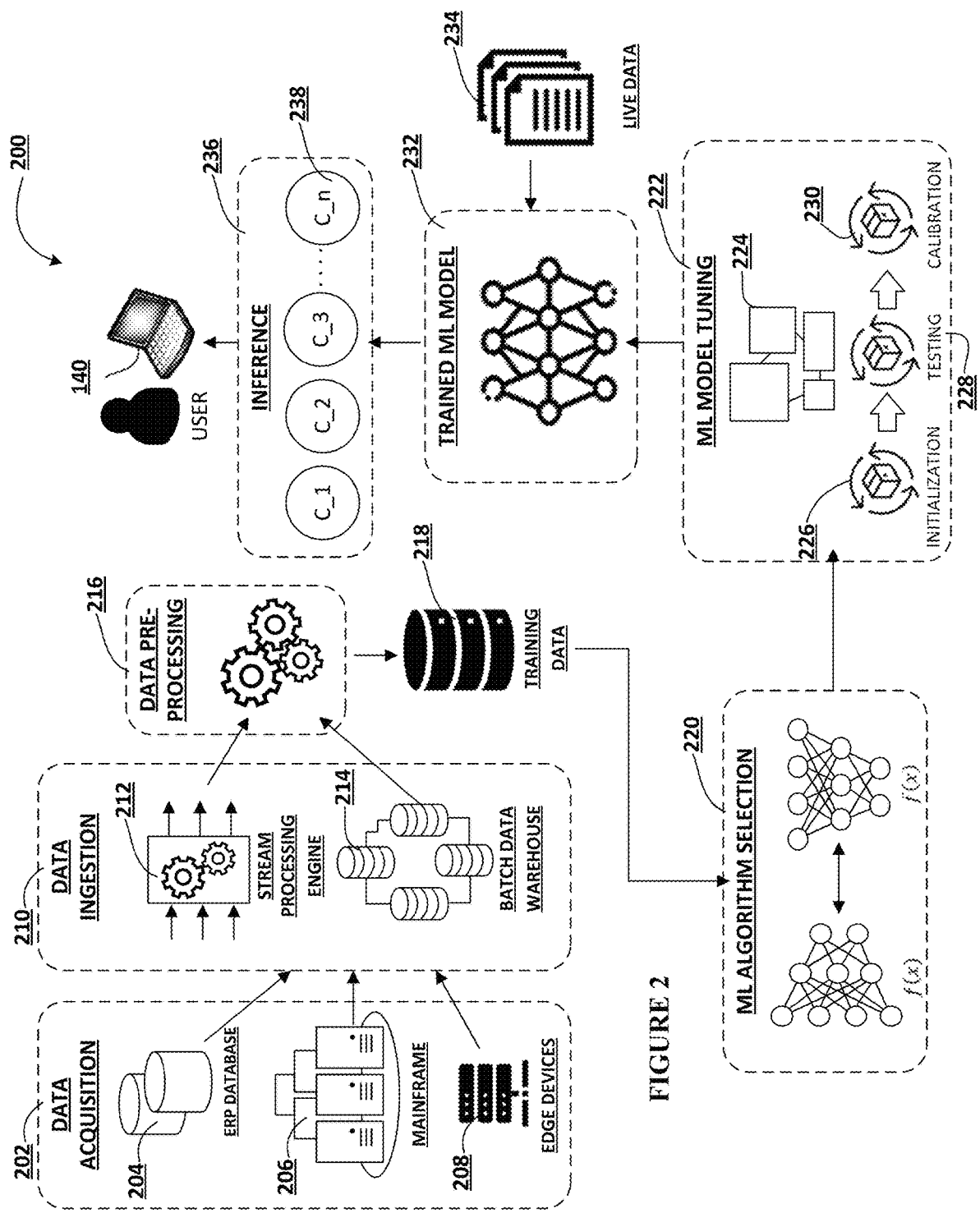
Figure 3:
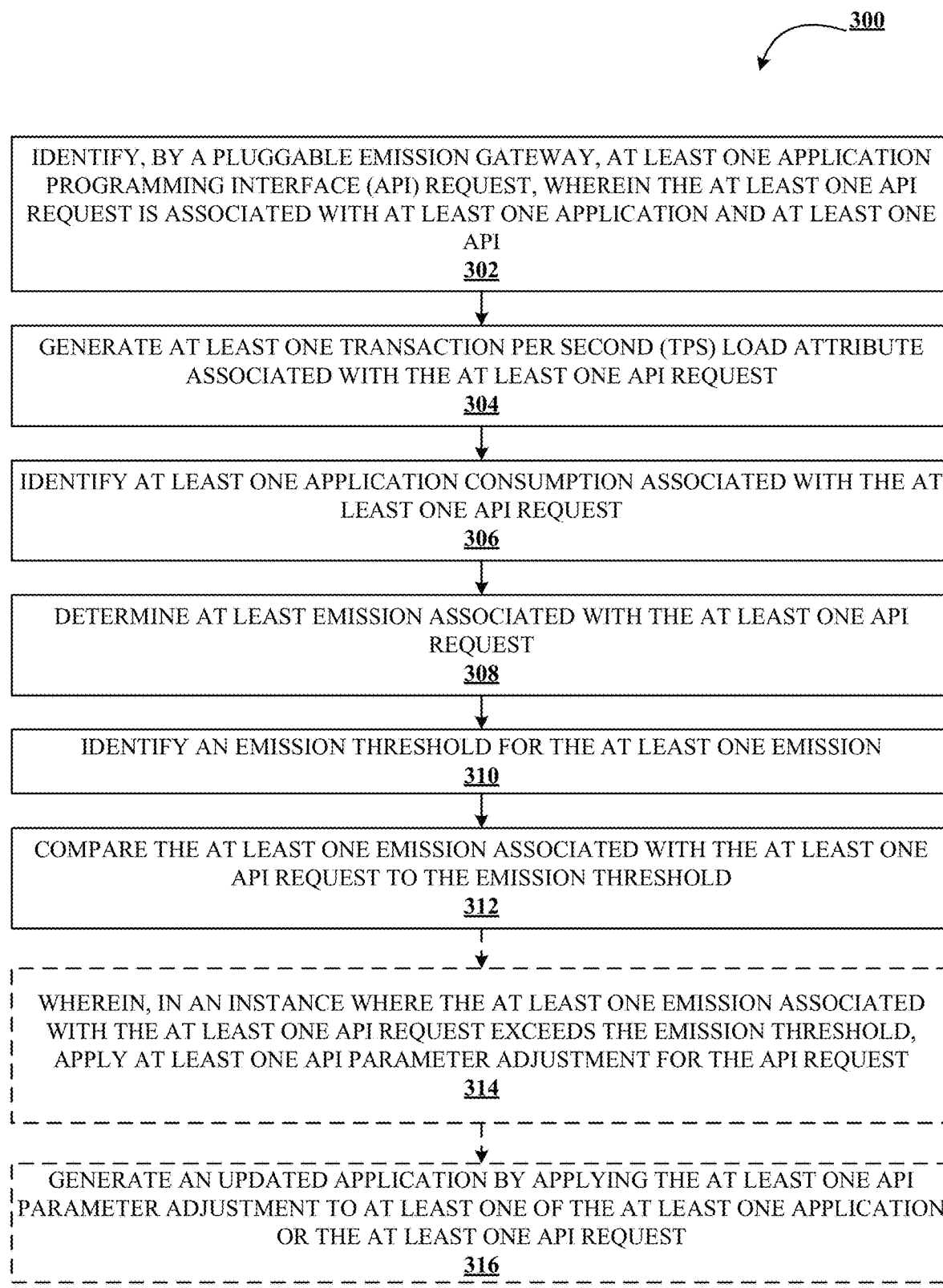
Figure 4:
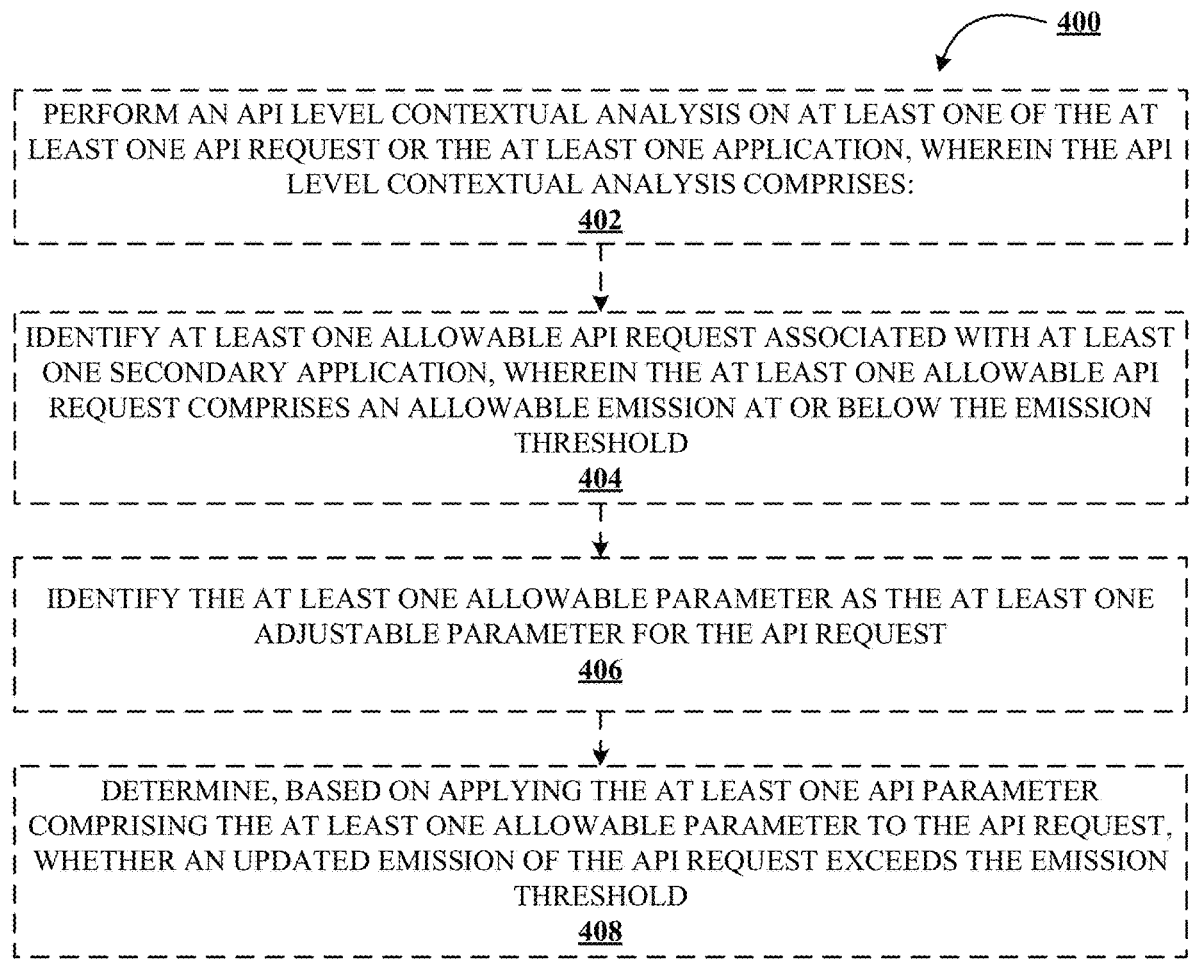
Figure 5:
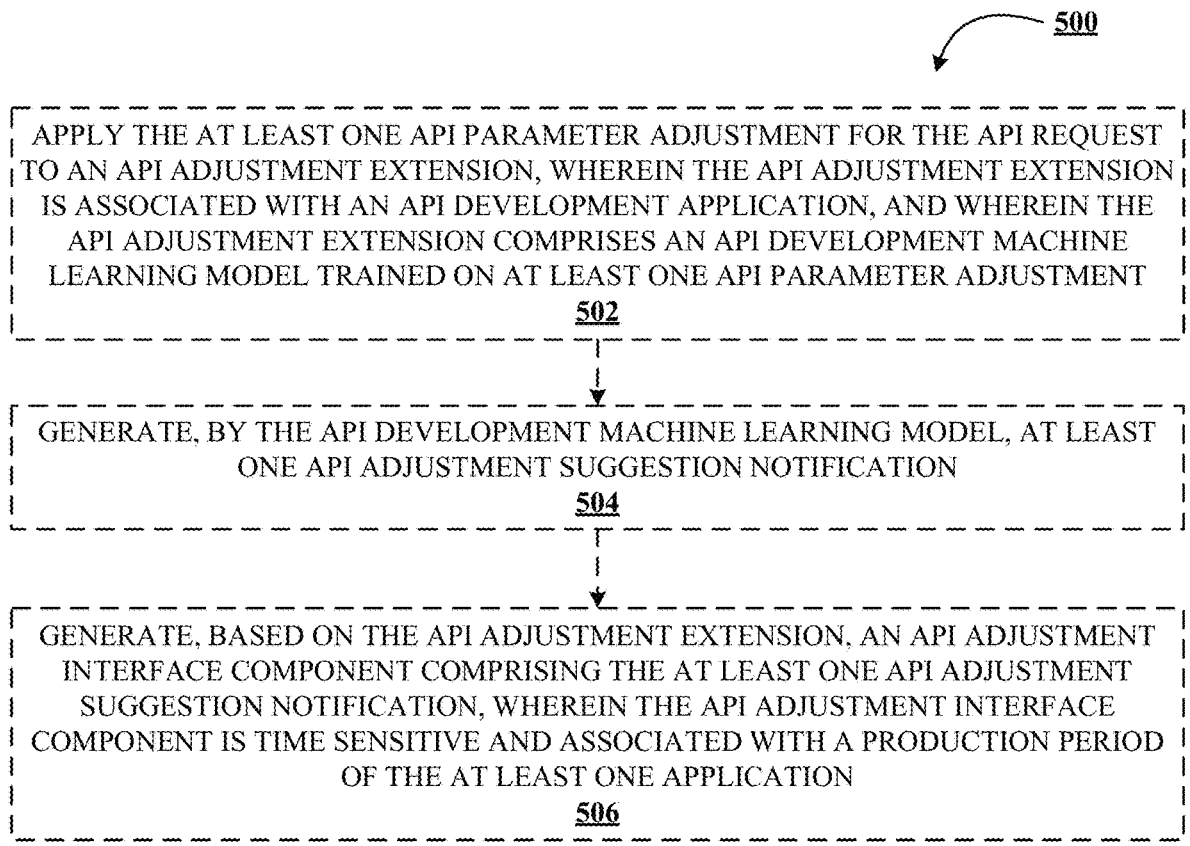
Figure 6:
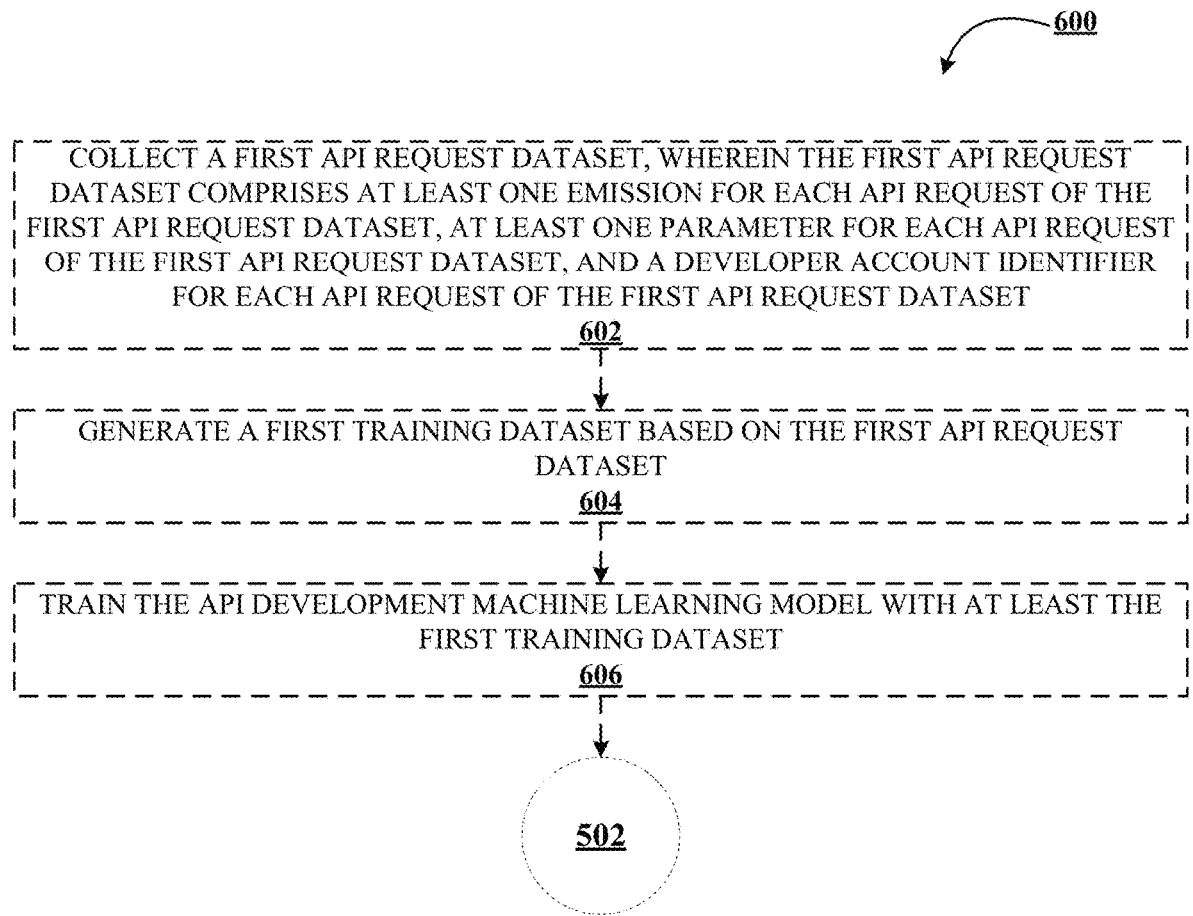
Figure 7A:
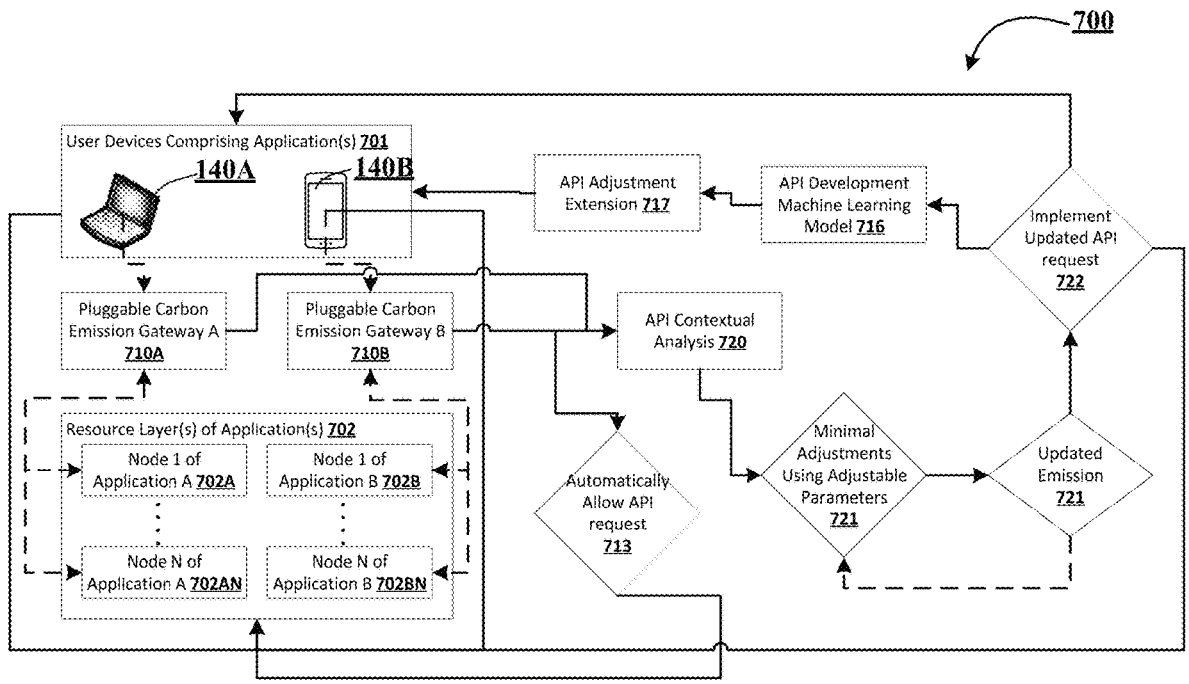
Figure 7B:
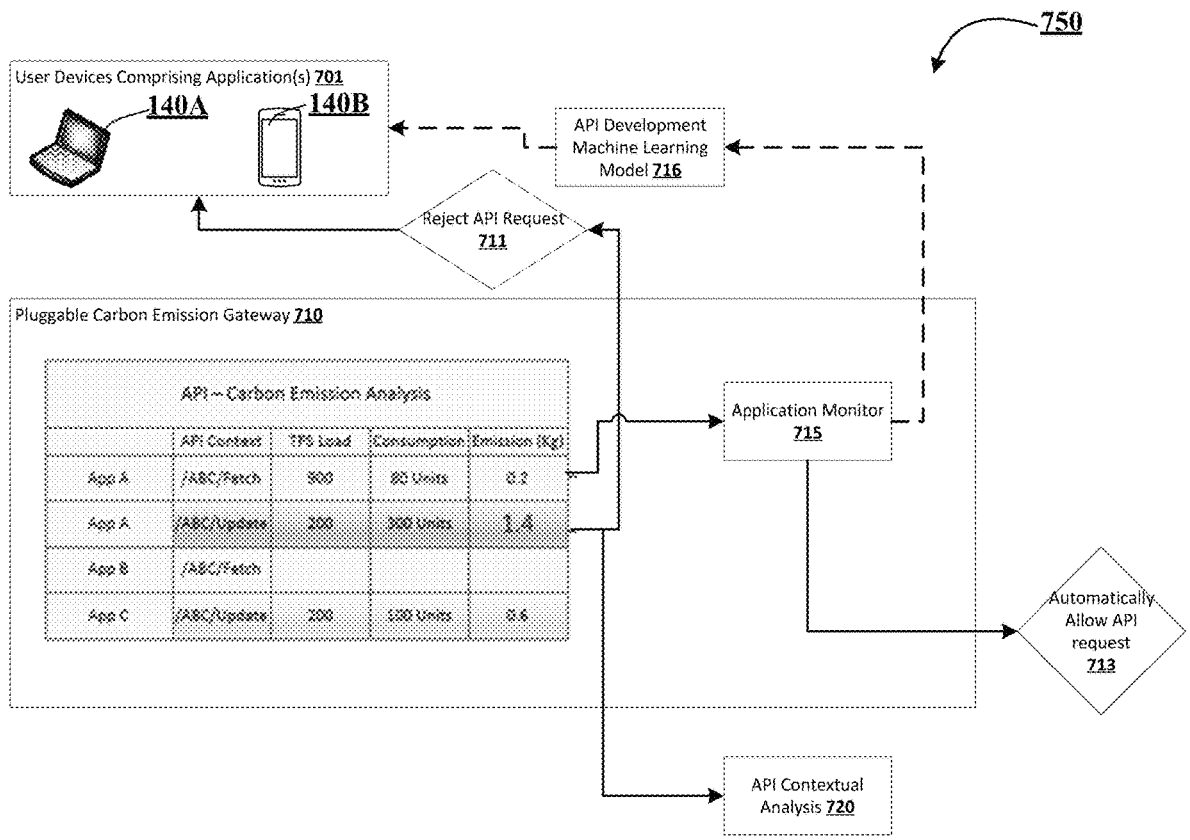

FIGS. 1A-1C illustrates technical components of an exemplary distributed computing environment for improving computer energy consumption and computer processing by implementing a pluggable carbon emission gateway, in accordance with an embodiment of the disclosure;

FIG. 2 illustrates an exemplary machine learning (ML) subsystem architecture 200, in accordance with an embodiment of the disclosure;

FIG. 3 illustrates a process flow for improving computer energy consumption and computer processing by implementing a pluggable carbon emission gateway, in accordance with an embodiment of the disclosure;

FIG. 4 illustrates a process flow for determining an updated emission of the API request and determining whether the updated emission meets or exceeds the emission threshold, in accordance with an embodiment of the disclosure;

FIG. 5 illustrates a process flow for generating an API adjustment interface component, in accordance with an embodiment of the disclosure;

FIG. 6 illustrates a process flow for training the API development machine learning model, in accordance with an embodiment of the disclosure; and FIGS. 7A-7B illustrate exemplary block diagrams for improving computer energy consumption and computer processing by implementing a pluggable carbon emission gateway, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Carbon emissions and their role on the environment today are a major problem for most technology industries, especially those industries dealing with blockchain, computers, electronic communications, and the like, which all are necessary for everyday life and cannot always be mitigated to improve emissions and help the environment. Thus, there exists a need for a system to—in real time—decrease carbon emission outputs from computing environments, without unduly burdening or slowing down the computer processes and necessary actions of the computers. For instance, computer components, such as computer processing units, graphical processing units, electronic storage components, networks, and/or the like produce a large amount of carbon emissions every second of every day, and there exists a great need to decrease such carbon emissions without decreasing computer functionality and processes.

Thus, there exists a need for a system, such as a pluggable carbon emission gateway system like that described herein, to update API requests and/or associated applications of the API requests that exceed carbon emission thresholds without decreasing computer functionality and by changing the API requests as minimally as possible.

Accordingly, the present disclosure provides a system (e.g., a pluggable carbon emission gateway system) configured to identify, by a pluggable emission gateway, at least one application programming interface (API) request, wherein the at least one API request is associated with at least one application and at least one API (e.g., a receiving application that is configured to complete the API request); generate at least one transaction per second (TPS) load attribute associated with the at least one API request (based on a determination of the TPS load on the application); identify at least one application consumption (e.g., a power consumption, an energy consumption, and/or the like) associated with the at least one API request; determine at least one emission (i.e., a carbon emission) associated with the at least one API request; identify an emission threshold for the at least one emission; compare the at least one emission associated with the at least one API request to the emission threshold, wherein, in an instance where the at least one emission associated with the at least one API request exceeds the emission threshold, apply at least one API parameter adjustment for the API request (e.g., an adjustable parameter associated with a previously allowed API request); and generate an updated application by applying the at least one API parameter adjustment to at least one of the at least one application or the at least one API request.

What is more, the present disclosure provides a technical solution to a technical problem. As described herein, the technical problem includes the improvement of computing energy consumption and computer processing. The technical solution presented herein allows for a pluggable carbon emission gateway system. In particular, the pluggable carbon emission gateway system is an improvement over existing solutions to computing energy consumption and computing processing, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources (e.g., determining minimal adjustable parameters to implement on AIP requests and/or associated applications without interfering with computer functionality and without straying too far from the original API requests). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for improving computer energy consumption and computer processing by implementing a pluggable carbon emission gateway 100, in accordance with an embodiment of the invention. As shown in FIG. 1A, the distributed computing environment 100 contemplated herein may include a system 130 (i.e., a pluggable carbon emission gateway system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP).

Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ .... $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ .... $C\_n$ 238) live data 234 based on how similar they are to one another to solve exploratory challenges where little is known about the data, provide a description or label (e.g., $C\_1$, $C\_2$ .... $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for improving computer energy consumption and computer processing by implementing a pluggable carbon emission gateway, in accordance with an embodiment of the disclosure. In some embodiments, a system (e.g., similar to one or more of the systems described herein with respect to FIGS. 1A-1C and 2) may perform one or more of the steps of process flow 300. For example, a pluggable carbon emission gateway system (e.g., the system 130 described herein with respect to FIG. 1A-1C) may perform the steps of process flow 300.

As shown in block 302, the process 300 may include the step of identifying—by a pluggable emission gateway—at least one application programming interface (API) request, wherein the at least one API request is associated with at least one application and at least one API.

As used herein, the pluggable emission gateway refers to a pluggable layer that is associated with an application, whereby the pluggable emission gateway is configured to receive, parse, and identify API calls (also referred to as "API requests" herein). The pluggable emission gateway herein described comprises a stand-alone module that runs independent of each of the applications used within a network, whereby the pluggable emission gateway may be removed from the application(s) without interfering with the running of the application(s). Further, and as shown herein, the pluggable emission gateway may also be fully controlled external to each of the applications it is associated with (and/or one pluggable emission gateway may be used for each application). Additionally, the pluggable emission gateway may be configured and built to determine the emission of each application, its associated hardware components and their emissions, and/or to determine the overall emission, consumption, and transactions per second (TPS) loads for each application. Additionally, and as described further below, the pluggable emission gateway—based on the emission determinations for each application for each API request—may act to automatically allow or disallow the API request based on the emission(s) determined for each application, whereby an emission threshold is pre-determined and used to determine whether to allow or disallow the API request.

Thus, the pluggable carbon emission gateway system—through the use of the pluggable emission gateway—may receive and/or identify an API request from an application, such as an application on a user device like a user device shown in FIG. 1A (e.g., a desktop, mobile device, a tablet, and/or the like), whereby the API request may request access to a particular application or website's server in order to request an action be taken and/or data be transmitted. In some embodiments, the pluggable emission gateway may identify an API request that has been generated by an entity, such as a financial institution and/or the like, after a user within the entity has received a communication (e.g., a telephone call) from a client or potential client requesting an action be taken and/or information be sent by an application and/or website. Thus, the entity (through its user) may generate and transmit an API request to the identified/receiving application (and its associated server) and/or to the identified/receiving website (and its server).

As shown in block 304, the process flow 300 may include the step of generate at least one transaction(s) per second (TPS) load attribute associated with the at least one API request. For instance, the pluggable carbon emission gateway system may identify—based on the API request identified—at least one TPS load associated with the receiving application, whereby the TPS load is based on the transactions executed per second by the receiving application, which may be identified based on an average of the transactions executed over a period of time (e.g., a few seconds, ten seconds, thirty seconds, a minute, and/or the like) divided by period to determine a transaction per second load. For example, the transactions per second load may comprise transactions associated with the gathering and sending of data to a requesting application and/or a requesting device, an action by the receiving application (e.g., an input of a password from the requesting user device, and/or the like), whereby the TPS load is associated with the API request as the input, a storage of the API request, and an associated output by the receiving application in order to complete the API request. Thus, and based on this identified TPS load of the API request and the receiving application, the pluggable carbon emission gateway system may generate a TPS load attribute for the API request and store the TPS load attribute as a description of the TPS load identified for the API request and/or the application.

Additionally, and in some embodiments, the pluggable carbon emission gateway system may also identify a power consumption of the application (e.g., the receiving application) in completing the API request, a heat of the application for the API request (e.g., a heat of the components for the completion of the API request), and/or the like, in order to determine/identify the emission of the API request and the application. Such an embodiment is described in further detail below.

As shown in block 306, the process flow 300 may include the step of identifying at least one application consumption associated with the at least one API request. For example, the pluggable carbon emission gateway system may identify the application's (associated with the API request) consumption, whereby such a consumption is associated with an energy consumption of the application.

In some embodiments, the consumption may be measured by the pluggable carbon emission gateway system by an energy consumption external monitor, such as a watt/hour meter which may be plugged in between the application's server device and a power supply, such as an outlet. In the embodiments where consumption is measured by an energy consumption external monitor for the entire server associated with the application, the pluggable carbon emission gateway system may receive real-time data of the application's consumption at the time the API request is transmitted and compare the real-time consumption to a baseline consumption (such as where the server is idle and has not received or identified any API requests).

In some embodiments, the consumption may be determined based on the thermal design power of the server and its associated components, including the central processing unit (CPU), storage component (memory power consumption), the amount of CPUs, the graphics processing unit (GPU consumption), and the number of GPUs in the server system, whereby the thermal design power may be used to estimate the energy consumption of each of the components individually, and used to determine the likely energy consumption over a period of time, such as the period of time that the application receives the API request.

Thus, and based on the measured and/or determined energy consumption of the server associated with the application, the pluggable carbon emission gateway system may identify the application's consumption when it has received the API request and/or when it has completed the API request. Thus, and in the embodiment where the consumption is measured and/or determined when the application's server has received the API request, the pluggable carbon emission gateway system may determine the real-time application's consumption before the API request is completed and may, thus, determine whether completing the API request would cause too great an energy consumption on the application's server. Further, and where the pluggable carbon emission gateway system is measuring/determining the energy consumption of the application's server at the completion of the API request, the pluggable carbon emission gateway system may determine whether completing the API request would cause too great a consumption on the server and, thus, determine whether the pluggable emission gateway should disallow and/or block the API request.

As shown in block 308, the process flow 300 may include the step of determining at least one emission associated with the at least one API request. For example, the pluggable carbon emission gateway system may determine at least one emission (i.e., a carbon emission) of the application based on the at least one API request. Such a carbon emission may be determined based on at least one of the TPS load attribute and/or the application consumption associated with the API request. In some embodiments, the emission may additionally and/or alternatively be based on the output heat of the application (e.g., its server components) to determine whether the carbon emission of the application in completing the API request would be too great (i.e., would exceed the emission threshold described herein). Thus, and in some embodiments, the pluggable carbon emission gateway system may additionally and/or alternatively comprise a heat sensor associated with the server of the application, whereby such a heat sensor may be in communication and transmitting real-time data of the application's server before, during, and/or after the API request is identified or received.

As shown in block 310, the process flow 300 may include the step of identifying an emission threshold for the at least one emission. For example, the pluggable carbon emission gateway system may identify an emission threshold that shall not be exceed by the emission of the application in completing the API request. Such an emission threshold may be pre-defined by a user of the pluggable carbon emission gateway system, by a client of the pluggable carbon emission gateway system, and/or by a manager of the pluggable carbon emission gateway system. In some embodiments, and by way of example, the emission threshold may comprise a value of 1.0 kg. Thus, and as described herein, the pluggable carbon emission gateway system may compare the emission threshold against each of the emissions measured, determined, and/or identified for the application(s) and the associated API request(s) in order to determine which API requests to automatically allow and/or which API requests to block.

As shown in block 312, the process flow 300 may include the step of comparing the at least one emission associated with the at least one API request to the emission threshold. For instance, the pluggable carbon emission gateway system may compare the at least one emission associated with the at least one API request to the emission threshold to determine whether to allow the API request (where the emission meets and/or is less than the emission threshold) or block the API request (where the emission exceeds the emission threshold).

In some embodiments, and where the emission does not exceed the emission threshold for the API request, the API request may be automatically allowed. In some embodiments, and where the emission does exceed the emission threshold, but where the API request comprises a critical attribute and/or identifier (which may be pre-identified based on the particular associated application, based on the API call type, and/or the like), the pluggable carbon emission gateway system may automatically allow the API request without adjusting any parameters. For example, and where the API request is initially blocked based on the comparison of the emission to the emission threshold, the pluggable carbon emission gateway system may identify a critical attribute and/or critical attribute of the API request and transmit the API request to the receiving application despite the emission comparison to the emission threshold. Such a critical attribute and/or critical identifier may be pre-determined by a user of the pluggable carbon emission gateway system, by a client of the pluggable carbon emission gateway system, by the pluggable carbon emission gateway system itself, and/or the like, and may be used by the pluggable carbon emission gateway system to identify those API requests that are critical and should always be allowed and completed.

In some embodiments, and as shown in block 314, the process flow 300 may include the step of applying at least one API parameter adjustment for an API request. Thus, and by of example, the pluggable carbon emission gateway system may apply at least one API parameter adjustment to the API request for those API requests that were blocked due to their emissions (i.e., their emission is greater than the emission threshold). Thus, and by way of example, the pluggable carbon emission gateway system may determine other, similar API requests (e.g., similar in their functions and/or tasks) and similar applications (e.g., similar receiving applications), whereby the other similar API requests and applications comprise emissions that meet and/or are below the emission threshold and may use the parameters of those similar API requests and applications to make adjustments to the current, blocked API request and/or make adjustments to the associated application. In this manner, the pluggable carbon emission gateway system may be configured to make small parameter adjustments to the API request(s) and/or associated applications in order to achieve the closest possible response to the original API request that was blocked while also allowing for lower carbon emissions. Such an embodiment is described in further detail below with respect to FIG. 4.

In some embodiments, and as shown in block 316, the process flow 300 may include the step of generating an updated application by applying the at least one API parameter adjustment to the at least one of the at least one application or the at least one API request. For instance, the pluggable carbon emission gateway system may generate an updated application and/or an updated API request by applying the at least one API parameter adjustment to the at least one of receiving application and/or the associated API request automatically and intermittently. In this manner, the pluggable carbon emission gateway system may make small adjustments to the API request and/or the application until the real-time emission of the application meets or is below the emission threshold, whereby the small adjustments are made and implemented at singular instances, such that each adjustment is made at a single instance and the emission of the application is measured and/or determined after each adjustment. Thus, the resulting API request and/or resulting application (after the parameter adjustment(s) have been implemented to decrease the emission to a level at or below the emission threshold) may be as close to the original API request and/or original application as possible and does not result in unnecessary parameter adjustments.

FIG. 4 illustrates a process flow 400 for determining an updated emission of the API request and determining whether the updated emission meets or exceeds the emission threshold, in accordance with an embodiment of the disclosure. In some embodiments, a system (e.g., similar to one or more of the systems described herein with respect to FIGS. 1A-1C and 2) may perform one or more of the steps of process flow 400. For example, a pluggable carbon emission gateway system (e.g., the system 130 described herein with respect to FIG. 1A-1C) may perform the steps of process flow 400.

In some embodiments, and as shown in block 402, the process flow 400 may include the step of performing an API level contextual analysis on at least one of the at least one API request or the at least one application, wherein the API level contextual analysis is discussed in further detail below. For example, the pluggable carbon emission gateway system may perform an API level contextual analysis on the blocked API request (e.g., the API request associated with the emission greater than the emission threshold) and associated application (e.g., the receiving application) in order to determine other, comparable API requests and/or comparable applications which are close to and/or similar to the blocked API request but which have emissions that meet or are lower than the emission threshold (and, thus would be allowable). In some embodiments, the pluggable carbon emission gateway system (via the API level contextual analysis) may determine the comparable API requests and/or comparable applications based on at least one of the TPS load attributes (where the TPS load attributes or the same and/or within a certain range, such as plus or minus 10% from the blocked API request and associated application), the consumption (where the consumption is the same and/or within a certain range, such as plus or minus 10% from the blocked API request and associated application), the context of the API requests are the same (e.g., blocked API request comprises a request to fetch data and at least one comparable API request also comprises a request to fetch data), and/or the like. In some embodiments, the API level contextual analysis may be performed by the pluggable carbon emission gateway system automatically, such as through the use of a machine learning model (e.g., like the API development machine learning model described in further detail below with respect to FIGS. 5 and 6).

In some embodiments, and as shown in block 404, the process flow 400 may include the step of identifying at least one allowable API request associated with at least one secondary application, wherein the at least one allowable API request comprises an allowable emission at or below the emission threshold. For example, the pluggable carbon emission gateway system may identify at least one allowable API request (e.g., an API request associated with an emission that is allowable based on the comparison with the emission threshold), whereby the at least one allowable API request is associated with a secondary application (which is similar to the application associated with the blocked API request). Thus, and based on the identification of the at least one (and/or a plurality of allowable API requests), the pluggable carbon emission gateway system may determine at least one comparable API request that is allowed, and which may be used in generating or determining adjustment parameters for the blocked API request.

In some embodiments, and as shown in block 406, the process flow 400 may include the step of identifying the at least one allowable parameter as the at least one adjustable parameter for the API request. For example, the pluggable carbon emission gateway system may identify, based on the at least one allowable API request (which is considered to be comparable to the blocked API request and/or associated application) at least one allowable parameter from the at least one allowable API request. Such a parameter associated with the allowable API request may comprise a particular coding/programming parameter, a particular coding/programming language, a particular component within the application, and/or the like, which the allowable parameter may be different than the parameter(s) of the blocked API request. In this manner, the pluggable carbon emission gateway system may determine the similarities and differences between the parameters of the blocked API request (and associated application) and the allowed API request (and/or associated application) in order to generate suggested adjustment parameters to the blocked API request (and/or associated application) in order to minutely change the blocked API request's parameters (and/or associated application parameters).

In some embodiments, the at least one allowable parameter is based on the at least one allowable API request comprising a closest API response to the at least one API request (e.g., the API response of the blocked API request). Thus, and in some embodiments, the at least one allowable parameter may be based on similarity(ies) in the API call/request and the associated function or output of the API request.

In some embodiments, the at least one allowable parameter is applied as a singular adjustable parameter of the at least one adjustable parameter for the API request at a first instance. For example, the pluggable carbon emission gateway system may generate singular adjustments to the blocked API request and/or the associated application, such that the singular adjustments are generated and implemented by themselves and an updated emission is determined or measured for the updated API request and/or updated associated application (from the blocked API request and associated application) until the updated emission is at and/or below the emission threshold. Thus, and by way of example, each parameter adjustment associated with the allowable parameter(s) may be implemented on the original (blocked) API request and/or associated application at their own particularized instances, and between each instance where a new parameter adjustment is implemented, the pluggable carbon emission gateway system may determine and/or measure the updated emission in real-time to determine when to stop implementing the adjustable parameter(s) to the previously blocked API request and/or associated application. In this manner, the updated API request and/or associated updated application may be as close to the original API request (which was previously blocked) and/or original application as possible while meeting the emission requirements of the pluggable carbon emission gateway system.

In some embodiments, and as described in further detail below, the adjustable parameter(s) used in order to meet the emission threshold may be used to train the API development machine learning model in order to better determine which adjustable parameter(s) to suggest for each blocked API request and/or each associated application.

In some embodiments, and as shown in block 408, the process flow 400 may include the step of determining—based on applying the at least one API parameter comprising the at least one allowable parameter to the API request—whether an updated emission of the API request exceeds the emission threshold. For example, the pluggable carbon emission gateway system may determine—based on applying or implementing the at least one API parameter (i.e., allowable parameter/adjustable parameter) to the API request (and/or associated application), whether a measured and/or determined emission after each API parameter is applied meets or is below the emission threshold. In the instance where the updated API request (which is updated with the API parameter(s) until the updated emission is lower than or meets the emission threshold) meets or is below the emission threshold, the pluggable carbon emission gateway system may allow the updated API request to be completed and/or transmitted to the receiving application for completion.

FIG. 5 illustrates a process flow 500 for generating an API adjustment interface component, in accordance with an embodiment of the disclosure. In some embodiments, a system (e.g., similar to one or more of the systems described herein with respect to FIGS. 1A-1C and 2) may perform one or more of the steps of process flow 500. For example, a pluggable carbon emission gateway system (e.g., the system 130 described herein with respect to FIG. 1A-1C) may perform the steps of process flow 500.

In some embodiments, and as shown in block 502, the process flow 500 may include the step of applying the at least one API parameter adjustment for the API request to an API adjustment extension, wherein the API adjustment extension is associated with an API development application, and wherein the API adjustment extension comprises an API development machine learning model trained on at least one API parameter adjustment. For example, the pluggable carbon emission gateway system may comprise an API adjustment extension which is configured to use the data herein described, along with the API development machine learning model trained on such data, to generate suggestions for API request developments and application developments in order to lessen and/or decrease carbon emissions on the back-end (e.g., during production of the API request and/or application).

Additionally, such an API adjustment extension, as used and described herein, refers to a website extension, program extension, and/or the like, which is configured to extend the capabilities of the host application, host program, host website, and/or the like. Thus, the API adjustment extension may be configured to add features and/or enhance the functionality of the host application, host program, host website, and/or the like, such as where the host is an application development program/application or API development program. In the embodiments where the host is an application development program/application or API development program, the pluggable carbon emission gateway system may generate the API adjustment extension with suggestions and/or interface components to show the API or application developer suggested measures and/or changes to make to the API requests or application code in order to lower the carbon emission output during production. Such an embodiment is disclosed in further detail below.

In some embodiments, and as shown in block 504, the process flow 500 may include the step of generating—by the API development machine learning model—at least one API adjustment suggestion notification. For example, the pluggable carbon emission gateway system may generate (via the API development machine learning model) at least one API adjustment suggestion notification, whereby the at least one API adjustment suggestion notification is based on previously used adjustable parameters which may have lowered the emission output for other similar API requests and/or associated applications. In some embodiments, the at least one adjustment suggestion notification may additionally and/or alternatively be based on adjustable parameters that may have lowered consumption(s) of the API request(s) and/or associated application(s), lowered TPS load(s) of the API request(s) and/or associated application(s), and other such improvements to overall performance of the API request(s) and associated application(s).

In some embodiments, and as shown in block 506, the process flow 500 may include the step of generating—based on the API adjustment extension—an API adjustment interface component comprising the at least one API adjustment suggestion notification, wherein the API adjustment interface component is time sensitive and associated with a production period of the at least one application. For example, the pluggable carbon emission gateway system may generate—based on the API adjustment extension and the API adjustment suggestion notification—an API adjustment interface component which comprises a data packet of the API adjustment suggestion notification which is transmitted via a network (such as network 110 of FIG. 1A) to a receiving user device, such as a user device associated with a developer of the API request and/or associated application for the API adjustment suggestion notification. In some embodiments, and based on the transmission of the API adjustment interface component to the user device, the pluggable carbon emission gateway system may use the API adjustment extension (which may additionally have been configured on the receiving user device) to show the data of the API adjustment suggestion notification by configuring the graphical user interface (GUI) of the user device. Thus, and as described herein, the pluggable carbon emission gateway system may be configured to transmit the API adjustment suggestion notification as an API adjustment interface component to a receiving user device, whereby the API adjustment suggestion notification comprises a suggestion and/or an indication of how to build and/or change a program, application, and/or API request to decrease emissions, decrease TPS load, decrease consumption, and/or the like, in order to improve processing speeds and improve carbon emission output. In some embodiments, such API adjustment suggestion notifications may additionally improve computing storage capabilities where the API adjustment suggestion notifications comprise suggestions to limit and/or decrease the volume of data used in the API request and/or in the associated application.

In some embodiments, the user device for transmitting the API adjustment interface component may be identified based on a developer identifier for the API request and/or the associated application, whereby the pluggable carbon emission gateway system may embed the developer identifier within the original API request and/or associated application in order to identify which developer has developed the API request and/or associated application. In some embodiments, the developer identifier may then be used by the pluggable carbon emission gateway system to transmit the API adjustment interface component to the user device that is associated with the same developer identifier. In some embodiments, the user device itself may not be associated with the developer identifier, but an authentication credential at a development application and/or development program may be used to identify the developer identifier and determine which user device to transmit the API adjustment interface component.

In some embodiments, the API adjustment interface component may only configure the GUI of the user device for a particular period, such as the period where API request and/or associated application is actively being worked on and/or where the API request and/or associated application is open and running on the developer's user device. Thus, and in this manner, the pluggable carbon emission gateway system may configure the GUI of the user in real-time and/or at a time when the API request or application is in production, even if such a time is only at a future period. In some embodiments, and in this manner, the API adjustment extension may automatically load suggested programming or coding for the API request and/or application for the developer to follow or ignore when creating and/or updating the API request and/or associated application. Thus, and in this manner, the API adjustment interface component may only configure the GUI of the user device for a particular period, such that the API adjustment interface component is time sensitive and associated with the production period of the application and/or API request.

FIG. 6 illustrates a process flow 600 for training the API development machine learning model, in accordance with an embodiment of the disclosure. In some embodiments, a system (e.g., similar to one or more of the systems described herein with respect to FIGS. 1A-1C and 2) may perform one or more of the steps of process flow 600. For example, a pluggable carbon emission gateway system (e.g., the system 130 described herein with respect to FIG. 1A-1C) may perform the steps of process flow 600.

In some embodiments, and as shown as process flow 600, the process flow 600 shown and described herein may be used to train the API development machine learning model described in block 502 of FIG. 5.

In some embodiments, and as shown in block 602, the process flow 600 may include the step of collecting a first API request dataset, wherein the first API request dataset comprises at least one emission for each API request of the first API request dataset, at least one parameter for each API request of the first API request dataset, and a developer account identifier for each API request of the first API request dataset. For example, the pluggable carbon emission gateway system may collect data from allowed API requests with their associated applications and their associated emissions, the allowable parameters from each of the allowed API requests and associated applications, the developer account identifier, and other such data as that described herein to generate at least one training dataset for the API development machine learning model. Additionally, and/or alternatively, the pluggable carbon emission gateway system may collect the TPS load data and attributes, the consumption data, and/or the like for each of the allowable API requests and associated applications in order to train the API development machine learning model on other such improvement data for the API requests and applications.

Additionally, and in some embodiments, the pluggable carbon emission gateway system may collect data on each of the adjustable parameters used for the API request(s) and associated application(s), along with identifiers of what adjustable parameters worked the best and/or what adjustable parameters did not have any effect on the emissions (and/or on the consumption or the TPS loads). Such adjustable parameter data may then be used in the same training dataset and/or in a new or updated training dataset to train the API development machine learning model.

In some embodiments, the pluggable carbon emission gateway system may additionally collect the parameters that were not adjusted in order to decrease the emission of the API requests and/or applications. In this manner, the pluggable carbon emission gateway system may train the API development machine learning model on what should not be changed within the API request and/or application in order to decrease the emission output.

In some embodiments, and as shown in block 604, the process flow 600 may include the step of generating a first training dataset based on the first API request dataset. For example, the pluggable carbon emission gateway system may generate at least a first training dataset with the above-identified data in order to apply the at least first training dataset to the API development machine learning model for training in a first instance. In some embodiments, a plurality of training datasets may be generated and applied to the API development machine learning model at separate and synchronous instances, thereby generating a detailed and robust manner.

In some embodiments, and as shown in block 606, the process flow 600 may include the step of training the API development machine learning model with at least the first training dataset. By way of example, the at least first training dataset may be applied to the API development machine learning model for training in a first instance, such that the API development machine learning model can generate informed suggestions on what should be changed and/or updated in the API requests and/or in the applications in order to improve computing functionality, emissions, and/or the like.

In some embodiments, the API development machine learning model may comprise at least one categorized coding pattern associated with the at least one developer account identifier. Thus, and in some embodiments, by training the API development machine learning model with the API request(s), the associated applications, and their associated parameters and linking each of the data to at least one developer account identifier (i.e., a developer identifier), the pluggable carbon emission gateway system—via the API development machine learning model—may be trained to identify specific programming and/or coding patterns generated by developers and may make developer-specific suggestions in the API adjustment suggestion notification. Thus, and as described herein, the API development machine learning model may further be trained for specific developers and their associated program and API development tendencies, which may then be used by the API development machine learning model to generate developer-specific suggestions on how to write and program the computing program and API requests on the backend and during production. Thus, and in this manner, the pluggable carbon emission gateway system may streamline improvements to computing environments before API requests are ever generated or transmitted and before applications become too overloaded with requests and responses.

FIGS. 7A-7B illustrate exemplary block diagrams 700 and 750 for improving computer energy consumption and computer processing by implementing a pluggable carbon emission gateway, in accordance with an embodiment of the disclosure. In some embodiments, a system (e.g., similar to one or more of the systems described herein with respect to FIGS. 1A-1C and 2) may perform one or more of the steps of block diagrams 700 and 750. For example, a pluggable carbon emission gateway system (e.g., the system 130 described herein with respect to FIG. 1A-1C) may perform the steps of block diagrams 700 and 750.

For instance and as shown herein, at least one user device (e.g., user device 140A, 140B, . . . 140(N) (not pictured)) may comprise at least one application 701, whereby each of these applications may be considered as a receiving application and/or a sending/requesting application, whereby each or associated with at least one API request such as the API requests described hereinabove. Thus, and for example, an API request may be generated and/or received at a user device (e.g., user device 140A, user device 140B, and/or the like), and each of the API requests may then be identified by a pluggable carbon emission gateway (e.g., pluggable carbon emission gateway 710A, pluggable carbon emission gateway 710B, and/or the like) which is configured to receive, identify, and parse the API request(s) in order to determine whether to allow and/or block/reject the API requests based on the associated emissions. Thus, and as shown in block diagram 700, the pluggable carbon emission gateway(s) may be communication with the resource layer(s) of the application(s) 702 herein described, such as a receiving application, whereby the resource layer(s) may comprise nodes (e.g., Node 1 of Application A 702A, Node 1 of Application B 702B, Node N of Application A 702AN, Node N of Application B 702BN, and/or the like) associated with each of the components (hardware and software) used by the application in completing the API requests. Thus, and by receiving data from each of these nodes, the pluggable carbon emission gateway(s) may determine whether to allow and/or disallow the API requests based on the output emissions, consumption, TPS loads, and/or the like of the application(s).

For instance, each pluggable carbon emission gateway may access and/or receive data from each of the Node(s) associated with the application based on the API request and/or based on the real-time data of the application before receiving the API request in order to determine each of the TPS load of the application, the consumption of the application, and the emission of the application. Based on this data, the pluggable emission gateway(s) may then automatically allow the API request when the emission is determined to be less than or equal to the emission threshold (e.g., automatically allow API request 713) or transmit the API request data (i.e., the blocked API request data) and associated application to API contextual analysis 720, such that the API contextual analysis 720 can determine allowable API requests and allowable parameters that may be implemented for the blocked API request and associated application.

In some embodiments, and upon transmitting the blocked API request data to the API contextual analysis 720, the API contextual analysis may determine each of the allowable adjustable parameters that may be used and implemented on the blocked API request and/or associated application. Thus, and as shown in block diagram 700, the pluggable carbon emission gateway system may be configured to make minimal adjustments using adjustable parameters 721 based on the adjustable parameters identified by the API contextual analysis 720, whereby after each minimal adjustment to the blocked API request and/or associated application, the pluggable carbon emission gateway system may determine the updated emission 721 and determine whether to make additional minimal adjustments using adjustable parameters 721 (e.g., upon determining the updated emission is still above the emission threshold) and/or implement the updated API request(s) 722 with the minimal adjustments already implemented (e.g., upon the updated emission comprising an emission at or below the emission threshold).

In some embodiments, and upon implementing the updated API request 722, the pluggable carbon emission gateway system may implement the updated API requests to the user devices comprising the application(s) 701 automatically. In some embodiments, and upon implementing the updated API request 722, the pluggable carbon emission gateway system may transmit the data regarding the adjustment parameters used to the API adjustment machine learning model 716 for further training, which may in turn be configured for use within the API adjustment extension to generate an API adjustment interface component for transmission to the user devices (e.g., user devices 140A, 140B, and/or the like).

Additionally, and as further shown in block diagram 750, the pluggable carbon emission gateway(s) (e.g., pluggable carbon emission gateway 140A, 140B, and/or the like) may be configured to determine—for each application (e.g., application A, Application B, and/or the like) and for each associated API request—the context of each API request, the TPS load for each API request associated with each application, the consumption for each API request and associated application, and the emission for each API request and associated application. Thus, and based on each of these determinations, the pluggable carbon emission gateway system—via the pluggable carbon emission gateway—may determine whether to allow or disallow each API request based on the associated emission as compared to the emission threshold. For instance, and where the emission is greater than 1.0 kg, the pluggable carbon emission gateway system may transmit the data of the API request to the API contextual analysis 720 for determination and implementation of adjustable parameters and determination of updated emissions before allowing an updated API request to be allowed. Additionally, the pluggable carbon emission gateway system may transmit the data of the rejected API request and associated application 711 back to the user device and associated application for feedback.

Additionally, alternatively, the pluggable carbon emission gateway system may determine—via the pluggable carbon emission gateway—that the API request should be allowed for completion. Thus, and in said embodiment, the pluggable carbon emission gateway system may transmit the data of the allowed API request to an application monitor 715, which may use the data of the allowed API request and associated application to further train the API development machine learning model 716. In some embodiments, the application monitor 715 of the pluggable carbon emission gateway 710 may additionally and/or alternatively transmit the data of the allowed API request automatically to the resource layer(s) of the application(s) 702, such that the resource layer(s) of the application may automatically complete the allowed API request (e.g., via the automatically allow API request 713).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for improving computer energy consumption and computer processing by implementing a pluggable carbon emission gateway title, the system comprising:
   a memory device with computer-readable program code stored thereon;
   at least one processing device, wherein executing the computer-readable code is configured to cause the at least one processing device to perform the following operations:
   identify, by a pluggable emission gateway, at least one application programming interface (API) request, wherein the at least one API request is associated with at least one application and at least one API;
   generate at least one transaction per second (TPS) load attribute associated with the at least one API request;

identify at least one application consumption associated with the at least one API request;
determine at least one emission associated with the at least one API request;
identify an emission threshold for the at least one emission;
compare the at least one emission associated with the at least one API request to the emission threshold,
  wherein, in an instance where the at least one emission associated with the at least one API request exceeds the emission threshold, apply at least one API parameter adjustment for the API request; and
generate an updated application by applying the at least one API parameter adjustment to at least one of the at least one application or the at least one API request.

2. The system of claim 1, the system further comprising:
perform an API level contextual analysis on at least one of the at least one API request or the at least one application, wherein the API level contextual analysis comprises:
  identifying at least one allowable API request associated with at least one secondary application, wherein the at least one allowable API request comprises an allowable emission at or below the emission threshold;
  identifying at least one allowable parameter associated with the at least one allowable API request and the at least one secondary application;
  identifying the at least one allowable parameter as the at least one adjustable parameter for the API request; and
  determining, based on applying the at least one API parameter comprising the at least one allowable parameter to the API request, whether an updated emission of the API request exceeds the emission threshold.

3. The system of claim 2, wherein the at least one allowable parameter is applied as a singular adjustable parameter of the at least one adjustable parameter for the API request at a first instance.

4. The system of claim 2, wherein the at least one allowable parameter is based on the at least one allowable API request comprising a closest API response to the at least one API request.

5. The system of claim 1, wherein the at least one emission comprises an at least one carbon emission associated with the at least one API request.

6. The system of claim 1, wherein the emission of the API request is based on at least one of a heat output, the at least one TPS load attribute, or a power consumption.

7. The system of claim 1, the system further comprising apply the at least one API parameter adjustment for the API request to an API adjustment extension, wherein the API adjustment extension is associated with an API development application, and wherein the API adjustment extension comprises an API development machine learning model trained on at least one API parameter adjustment.

8. The system of claim 7, the system further comprising:
generate, by the API development machine learning model, at least one API adjustment suggestion notification; and
generate, based on the API adjustment extension, an API adjustment interface component comprising the at least one adjustment suggestion notification, wherein the API adjustment interface component is time sensitive and associated with a production period of the at least one application.

9. The system of claim 8, wherein the at least one API adjustment suggestion notification is based on at least one of an application performance of the at least one application for the at least one API request or the at least one emission associated with the at least one API request.

10. The system of claim 7, the system further comprising:
collect a first API request dataset, wherein the first API request dataset comprises at least one emission for each API request of the first API request dataset, at least one parameter for each API request of the first API request dataset, and a developer account identifier for each API request of the first API request dataset;
generate a first training dataset based on the first API request dataset; and
train the API development machine learning model with at least the first training dataset.

11. The system of claim 6, wherein the API development machine learning model comprises at least one categorized coding pattern associated with the at least one developer account identifier.

12. A computer program product for improving computer energy consumption and computer processing by implementing a pluggable carbon emission gateway title, wherein the computer program product comprises at least one non-transitory computer-readable medium having computer-readable program code portions embodied therein, the computer-readable program code portions which when executed by a processing device are configured to cause the processor to perform the following operations:
identify, by a pluggable emission gateway, at least one application programming interface (API) request, wherein the at least one API request is associated with at least one application and at least one API;
generate at least one transaction per second (TPS) load attribute associated with the at least one API request;
identify at least one application consumption associated with the at least one API request;
determine at least one emission associated with the at least one API request;
identify an emission threshold for the at least one emission;
compare the at least one emission associated with the at least one API request to the emission threshold,
  wherein, in an instance where the at least one emission associated with the at least one API request exceeds the emission threshold, apply at least one API parameter adjustment for the API request; and
generate an updated application by applying the at least one API parameter adjustment to at least one of the at least one application or the at least one API request.

13. The computer program product of claim 12, wherein the processing device is configured to cause the processor to perform the following operations:
perform an API level contextual analysis on at least one of the at least one API request or the at least one application, wherein the API level contextual analysis comprises:
  identifying at least one allowable API request associated with at least one secondary application, wherein the at least one allowable API request comprises an allowable emission at or below the emission threshold;

identifying at least one allowable parameter associated with the at least one allowable API request and the at least one secondary application;

identifying the at least one allowable parameter as the at least one adjustable parameter for the API request; and determining, based on applying the at least one API parameter comprising the at least one allowable parameter to the API request, whether an updated emission of the API request exceeds the emission threshold.

14. The computer program product of claim 13, wherein the at least one allowable parameter is applied as a singular adjustable parameter of the at least one adjustable parameter for the API request at a first instance.

15. The computer program product of claim 12, wherein the at least one allowable parameter is based on the at least one allowable API request comprising a closest API response to the at least one API request.

16. The computer program product of claim 12, wherein the emission of the API request is based on at least one of a heat output, the at least one TPS load attribute, or a power consumption.

17. A computer implemented method for improving computer energy consumption and computer processing by implementing a pluggable carbon emission gateway title, the computer implemented method comprising:

identifying, by a pluggable emission gateway, at least one application programming interface (API) request, wherein the at least one API request is associated with at least one application and at least one API;

generating at least one transaction per second (TPS) load attribute associated with the at least one API request;

identifying at least one application consumption associated with the at least one API request;

determining at least one emission associated with the at least one API request;

identifying an emission threshold for the at least one emission;

comparing the at least one emission associated with the at least one API request to the emission threshold, wherein, in an instance where the at least one emission associated with the at least one API request exceeds the emission threshold, applying at least one API parameter adjustment for the API request; and generating an updated application by applying the at least one API parameter adjustment to at least one of the at least one application or the at least one API request.

18. The computer implemented method of claim 17, the computer implemented method further comprising:

performing an API level contextual analysis on at least one of the at least one API request or the at least one application, wherein the API level contextual analysis comprises:

identifying at least one allowable API request associated with at least one secondary application, wherein the at least one allowable API request comprises an allowable emission at or below the emission threshold;

identifying at least one allowable parameter associated with the at least one allowable API request and the at least one secondary application;

identifying the at least one allowable parameter as the at least one adjustable parameter for the API request; and determining, based on applying the at least one API parameter comprising the at least one allowable parameter to the API request, whether an updated emission of the API request exceeds the emission threshold.

19. The computer implemented method of claim 18, wherein the at least one allowable parameter is applied as a singular adjustable parameter of the at least one adjustable parameter for the API request at a first instance.

20. The computer implemented method of claim 18, wherein the at least one allowable parameter is based on the at least one allowable API request comprising a closest API response to the at least one API request.

* * * * *